(12) United States Patent
Mol et al.

(10) Patent No.: US 11,820,168 B2
(45) Date of Patent: Nov. 21, 2023

(54) WHEEL HUB ASSEMBLY WITH INTERNAL LOAD SENSORS

(71) Applicant: AKTIEBOLAGET SKF, Gothenburg (SE)

(72) Inventors: Hendrik Anne Mol, Sleeuwijk (NL); Elizabertus Maljaars, Houten (NL); Johannes Ravesloot, Houten (NL); Nicolaas Simon Willem Den Haak, Zwijndrecht (NL); Matteo Senesi, Utrecht (NL); Feng Qiu, Ijsselstein (NL)

(73) Assignee: AKTIEBOLAGET SKF, Gothenburg (SE)

( * ) Notice: Subject to any disclaimer, the term of this patent is extended or adjusted under 35 U.S.C. 154(b) by 280 days.

(21) Appl. No.: 17/034,876

(22) Filed: Sep. 28, 2020

(65) Prior Publication Data
US 2022/0097452 A1  Mar. 31, 2022

(51) Int. Cl.
*F16C 19/00* (2006.01)
*B60B 27/00* (2006.01)
(Continued)

(52) U.S. Cl.
CPC ...... *B60B 27/0068* (2013.01); *B60B 27/0094* (2013.01); *B60B 27/02* (2013.01); *F16C 19/184* (2013.01); *G01L 1/225* (2013.01); *B60B 27/0005* (2013.01); *B60B 2380/30* (2013.01); *B60B 2380/75* (2013.01); *F16C 2326/02* (2013.01)

(58) Field of Classification Search
CPC . B60B 27/0068; B60B 27/0094; B60B 27/02; B60B 27/0005; B60B 2380/75; F16C 19/184; F16C 2326/02; G01L 1/225
See application file for complete search history.

(56) References Cited

U.S. PATENT DOCUMENTS

| 4,203,319 A | 5/1980 | Lechler |
| 4,341,122 A | 7/1982 | Lechler et al. |

(Continued)

FOREIGN PATENT DOCUMENTS

| CN | 101326430 A | * 12/2008 | ............ B60B 27/00 |
| EP | 0018936 A1 | 11/1980 | |

(Continued)

*Primary Examiner* — Jamel E Williams
(74) *Attorney, Agent, or Firm* — J-TEK LAW PLLC; Scott T. Wakeman; Mark A. Ussai (57) ABSTRACT

A hub assembly includes an inner rotatable hub having inboard and outboard axial ends, a radial flange extending outwardly from the outboard axial end and connectable with the wheel, an inner circumferential surface, and an opposing outer circumferential surface providing inboard and outboard inner races. An outer hub is disposed about the inner hub, connectable with the chassis and has inboard and outboard axial ends, an outer circumferential surface and an inner circumferential surface. The inner surface provides inboard and outboard outer races and a central surface section extending between the two outer races. First and second sets of rolling elements are disposed between the inner and outer races. One or more sensors are each disposed on the central surface section of the outer hub and are each configured to sense strain within the outer hub generated by the rolling elements.

12 Claims, 9 Drawing Sheets

(51) Int. Cl.
*G01L 1/22* (2006.01)
*B60B 27/02* (2006.01)
*F16C 19/18* (2006.01)

(56) References Cited

U.S. PATENT DOCUMENTS

| | | | |
|---|---|---|---|
| 5,140,849 A | | 8/1992 | Fujita et al. |
| 6,546,785 B1 | | 4/2003 | Discenzo |
| 8,021,052 B2 | * | 9/2011 | Ozaki ................... B60B 27/00 324/207.13 |
| 2006/0153482 A1 | * | 7/2006 | Koike ................. G01L 5/0023 384/448 |
| 2008/0095483 A1 | | 4/2008 | Duret et al. |
| 2009/0252444 A1 | * | 10/2009 | Duret ..................... F16C 33/58 384/448 |
| 2010/0262383 A1 | | 10/2010 | Isobe et al. |
| 2019/0323908 A1 | * | 10/2019 | Isono ................... G01L 1/2231 |
| 2022/0049955 A1 | | 2/2022 | Lou et al. |

FOREIGN PATENT DOCUMENTS

| | | | | | |
|---|---|---|---|---|---|
| EP | 2006653 A1 | * | 12/2008 | ............ | B60B 27/00 |
| EP | 2107260 A1 | * | 10/2009 | ............ | F16C 19/184 |
| EP | 2119928 A1 | | 11/2009 | | |
| EP | 2107260 B1 | | 5/2011 | | |
| EP | 2360384 A1 | | 8/2011 | | |
| FR | 2929670 A1 | * | 10/2009 | ............ | F16C 19/184 |
| FR | 2929670 B1 | | 12/2010 | | |
| JP | 2004045370 A | * | 2/2004 | ............ | B60B 27/00 |
| JP | 2005214229 A | | 8/2005 | | |
| JP | 2009041704 A | | 2/2009 | | |
| WO | 0177634 A2 | | 10/2001 | | |
| WO | WO-0177634 A2 | * | 10/2001 | ............ | F16C 19/522 |
| WO | WO-2005022104 A1 | * | 3/2005 | ............ | B60B 27/00 |
| WO | WO-2007023785 A1 | * | 3/2007 | ......... | B60B 27/0005 |
| WO | WO-2008117534 A1 | * | 10/2008 | ......... | B60B 27/0005 |
| WO | WO-2011038481 A1 | * | 4/2011 | ......... | B60B 27/0068 |
| WO | WO-2011152536 A1 | * | 12/2011 | ......... | B60B 27/0005 |

* cited by examiner

WHEEL HUB ASSEMBLY WITH INTERNAL LOAD SENSORS

BACKGROUND OF THE INVENTION

The present invention relates to bearings, and more particularly to sensorized wheel hub assemblies.

Wheel hub assemblies or wheel hub bearings are generally known and are used to rotatably couple wheels with vehicles. Such assemblies include an inner hub, an outer hub disposed about the inner hub and one or two rows of rolling elements coupling the inner and outer hubs. One hub is fixed and the other rotates abouts a central axis so as to permit rotation of the wheel with respect to the vehicle. Certain wheel hub assemblies are "sensorized" or provided with one or more sensors for determining certain characteristics of the hub assembly, such as rotational speed, angular position, etc.

SUMMARY OF THE INVENTION

In one aspect, the present invention is a sensorized wheel hub assembly for rotatably connecting a wheel with at least one of a shaft and a chassis. The hub assembly comprises an inner hub rotatable about a central axis and having opposing inboard and outboard axial ends, a radial flange extending outwardly from the outboard axial end and connectable with the wheel, an inner circumferential surface defining a central bore for receiving the shaft, and an opposing outer circumferential surface. The outer surface provides an inboard inner race and an outboard inner race spaced axially from the inboard inner race. An outer hub is disposed about the inner hub, is connectable with the chassis and has inboard and outboard axial ends, an outer circumferential surface and an inner circumferential surface. The inner surface provides an inboard outer race, an outboard outer race spaced axially from the inboard outer race, and a central surface section extending between the inboard and outboard outer races. A first set of rolling elements is disposed between the inboard inner race and the inboard outer race and a second set of rolling elements is disposed between the outboard inner race and the outboard outer race. Further, at least one sensor is disposed on the central surface section of the outer hub and is configured to sense strain within the outer hub generated by the rolling elements.

In another aspect, the present invention is again a wheel hub assembly for connecting a wheel with at least one of a shaft and a chassis. The hub assembly comprises an inner hub connectable with one of the wheel and the chassis and having opposing inboard and outboard axial ends, an inner circumferential surface defining a central bore for receiving the shaft, and an opposing outer circumferential surface. The outer surface provides an inboard inner race, an outboard inner race spaced axially from the inboard inner race, and a central surface section extending between the inboard and outboard inner races. An outer hub is disposed about the inner hub, is connectable with the other one of the wheel and the chassis, and has inner and outer axial ends, an outer circumferential surface and an inner circumferential surface. The inner surface provides an inboard outer race, an outboard outer race spaced axially from the inboard outer race, and a central surface section extending between the inboard and outboard outer races. A first set of rolling elements is disposed between the inboard inner race and the inboard outer race and a second set of rolling elements disposed between the outboard inner race and the outboard outer race. Further, at least one sensor is disposed on the central surface section of the inner hub and is configured to strain within the inner hub generated by the rolling elements or at least one sensor is disposed on the central surface section of the outer hub and is configured to sense strain within the outer hub generated by the rolling elements.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-9 a sensorized wheel hub assembly 10 for rotatably connecting a wheel 1 with a shaft 2 and/or a chassis 3 of a vehicle (e.g., a car, truck, etc.). The wheel hub assembly 10 basically comprises an inner hub 12, which is preferably rotatable about a central axis $A_C$, a fixed, outer hub 14 disposed about the inner hub 12, first and second sets 17, 19 of rolling elements 16, 18, respectively, disposed between the inner and outer hubs 12, 14 and spaced axially apart. Further, and at least one and preferably a plurality of sensors 20 are attached to a central inner surface section 15 of the outer hub 14, or alternatively to a central outer surface section 13 of the inner hub 12. In either case, the sensors 20 are located internally or interiorly on the wheel hub assembly 10 so as to be sealed and protected from damage, such as from impacts, and the hub assembly has at least one continuous circular or circumferential mounting surface available to provide flexibility or latitude for selecting specific attachment/mounting locations for the sensors 20, as discussed in greater detail below.

Figure 8:
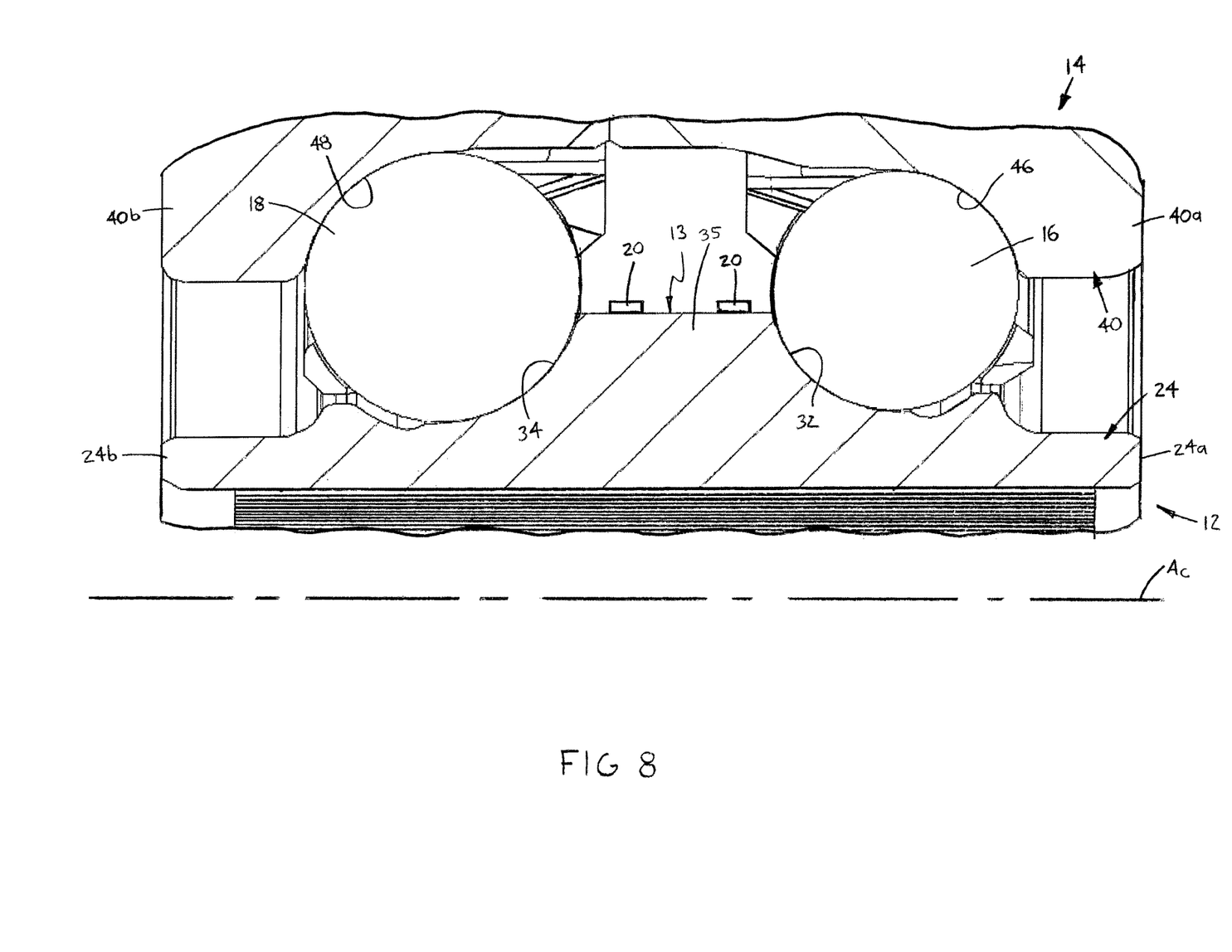
FIG. 8 is an enlarged, broken-away axial cross-sectional view of an alternative construction of the wheel hub assembly, shown with sensors on the inner hub.

Referring now to FIGS. 1-3 and 8, the inner hub 12 includes a generally cylindrical or tubular body 24 having opposing inboard and outboard axial ends 24a, 24b, respectively, an inner circumferential surface 26 and an opposing outer circumferential surface 28. Preferably, a radial flange 30 extends outwardly from the outboard axial end 24b and is connectable with the wheel 1 so as to mount the wheel 1 to the vehicle. The inner circumferential surface 26 defines a central bore 27 for receiving the shaft 2 and preferably includes a plurality of splines 32 mateable or coupleable with a set of splines 4 of the shaft 2. Also, the outer circumferential surface 28 provides an inboard inner race 32, specifically on an annular insert 33, and an outboard inner race 34 spaced axially from the inboard inner race 32, the central surface section 13 being defined on the outer surface 28 between the races 32, 34. When the inner hub 12 is configured to be fixed relative to a rotatable outer hub 14, the inner hub 12 preferably has a radially-outwardly extending central projection 35 providing the central surface section 13 for attachment of one or more sensors 20, as shown in FIG. 8.

Referring now to FIGS. 1, 2 4, 5 and 7, the outer hub 14 is connectable with the chassis 3 (i.e., through a steering knuckle or suspension) and includes a generally cylindrical or tubular body 40 having inboard and outboard axial ends 40a, 40b, respectively, an outer circumferential surface 42 and an inner circumferential surface 44. The inner surface 44 provides an inboard outer race 46 and an outboard outer race 48 spaced axially from the inboard outer race 46. The central surface section 15 is defined on the inner surface 44 so as to extend axially between the inboard and outboard outer races 46, 48. Preferably, a single radial flange (not shown) or a plurality of lugs 49 extend radially-outwardly from the hub outer surface 42 and are connectable with the steering knuckle or suspension.

Figure 5:
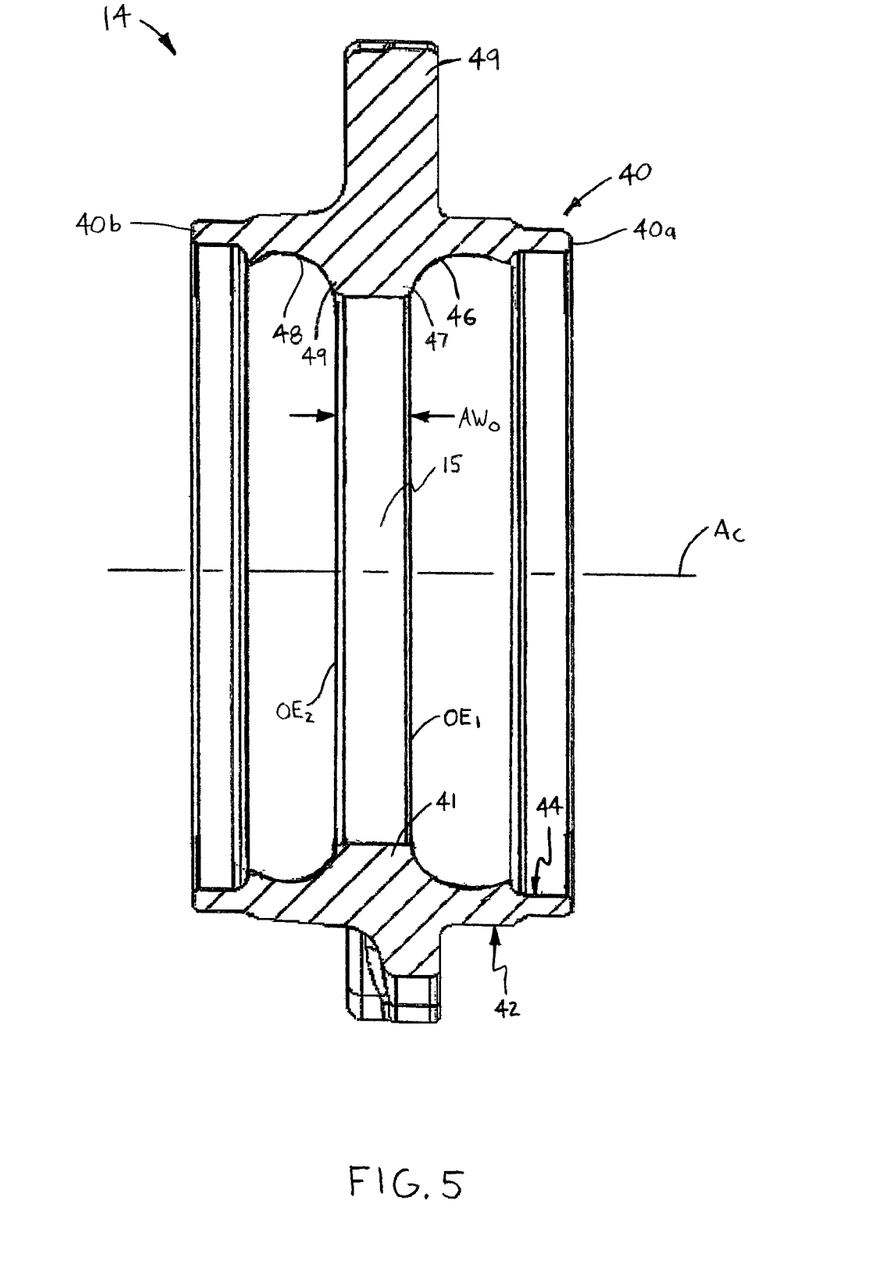
FIG. 5 is an axial cross-sectional view of the outer hub.

Preferably, the outer hub 14 has a radially-inwardly extending central projection 41 providing the central surface section 15, a shoulder 47 of the inboard outer race 46 and a shoulder 49 of the outboard outer race 48. More specifically, the central surface section 15 is defined between a first circumferential edge $OE_1$ adjacent to the inboard outer race 46 and a second circumferential edge $OE_2$ adjacent to the outboard outer race 48. As indicated in FIGS. 5-7, the central surface section 15 has an axial width $AW_O$ between the first and second circumferential edges $OE_1$, $OE_2$, as discussed in greater detail below.

Figure 1:
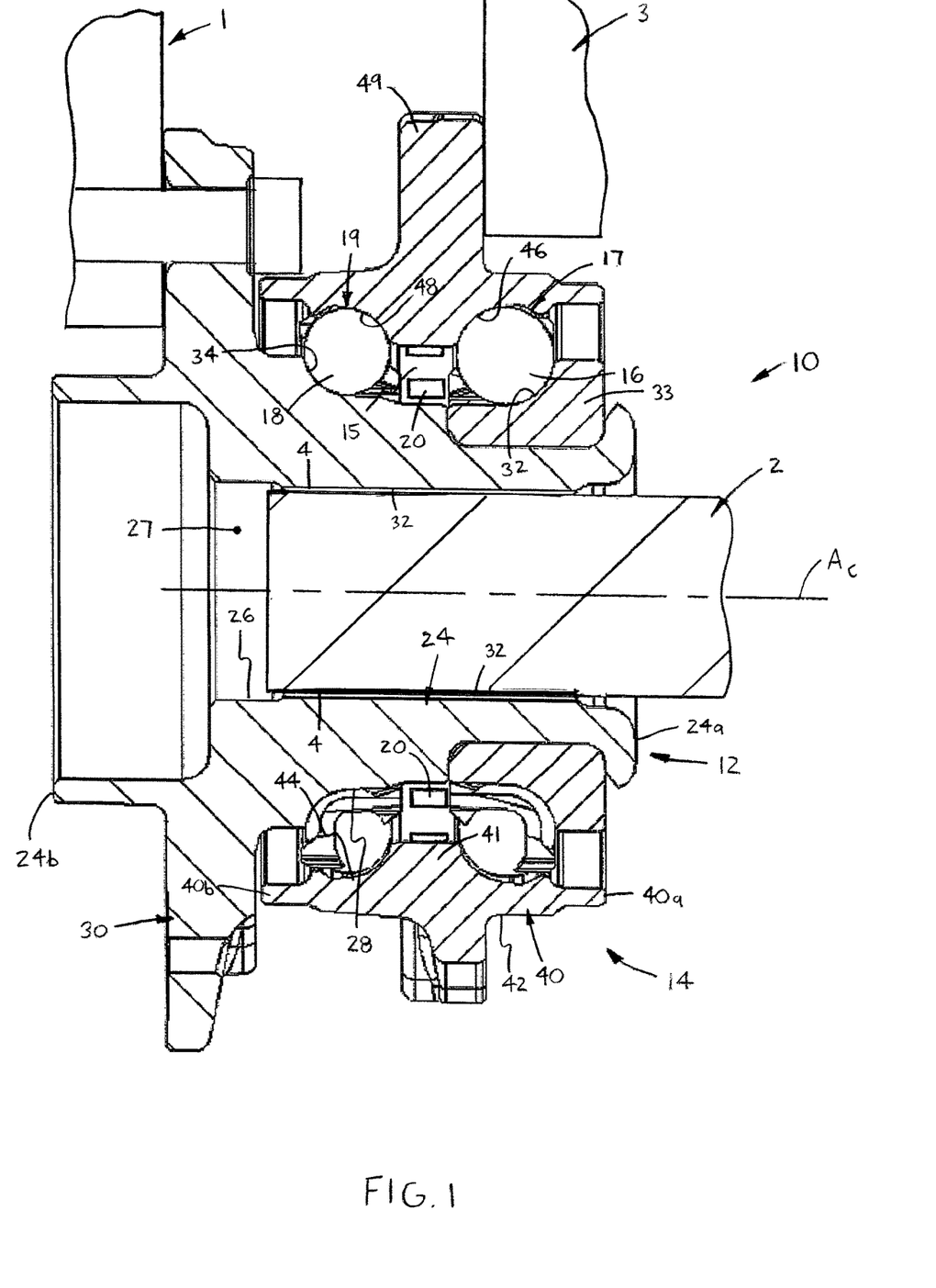
FIG. 1 is an axial cross-sectional view of a wheel hub assembly in accordance with the present invention, shown connected with a wheel, a chassis and a shaft.
Figure 2:
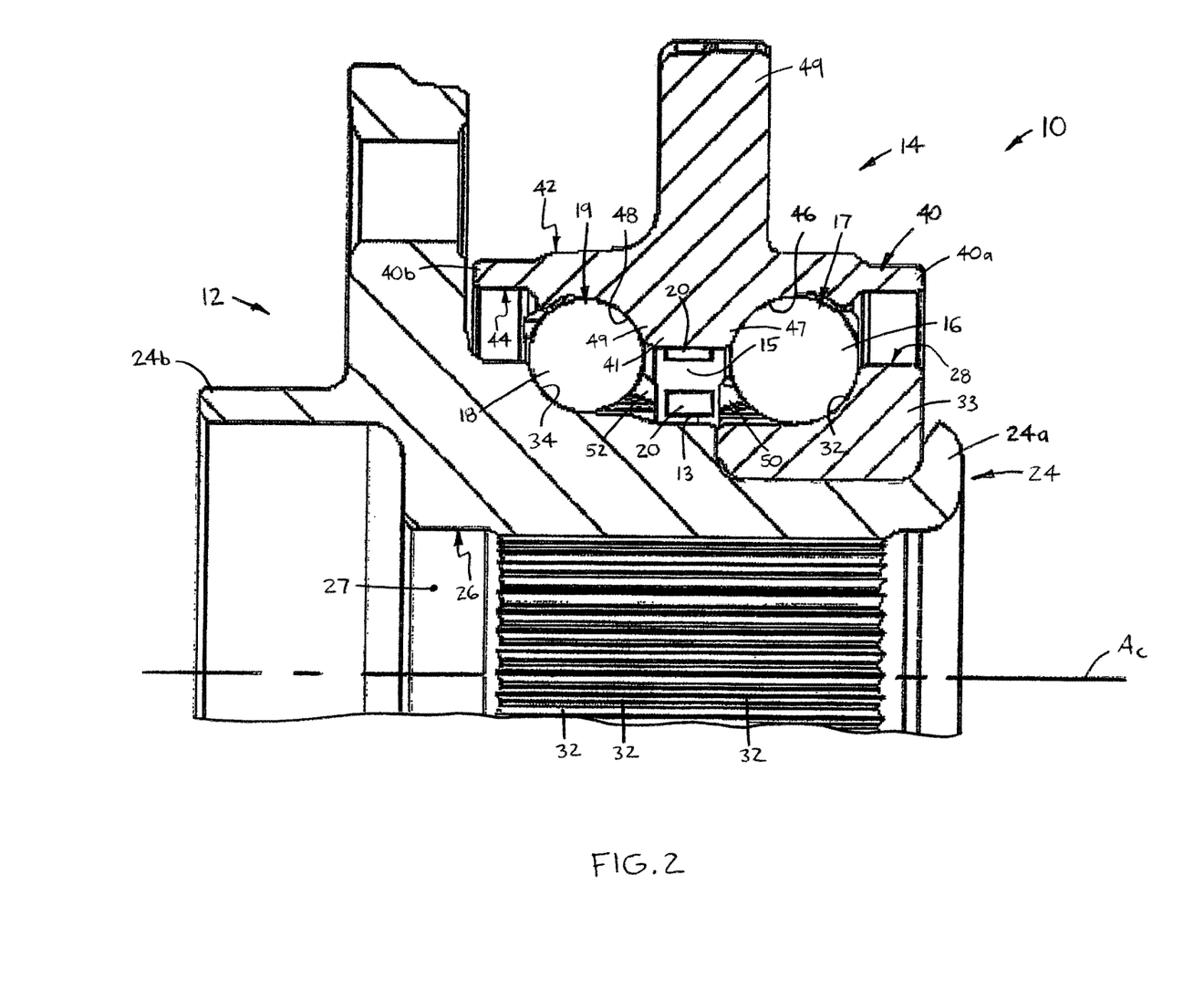
FIG. 2 is an enlarged, broken-away view of a portion of FIG. 1, shown separate from other vehicle components.
Figure 3:
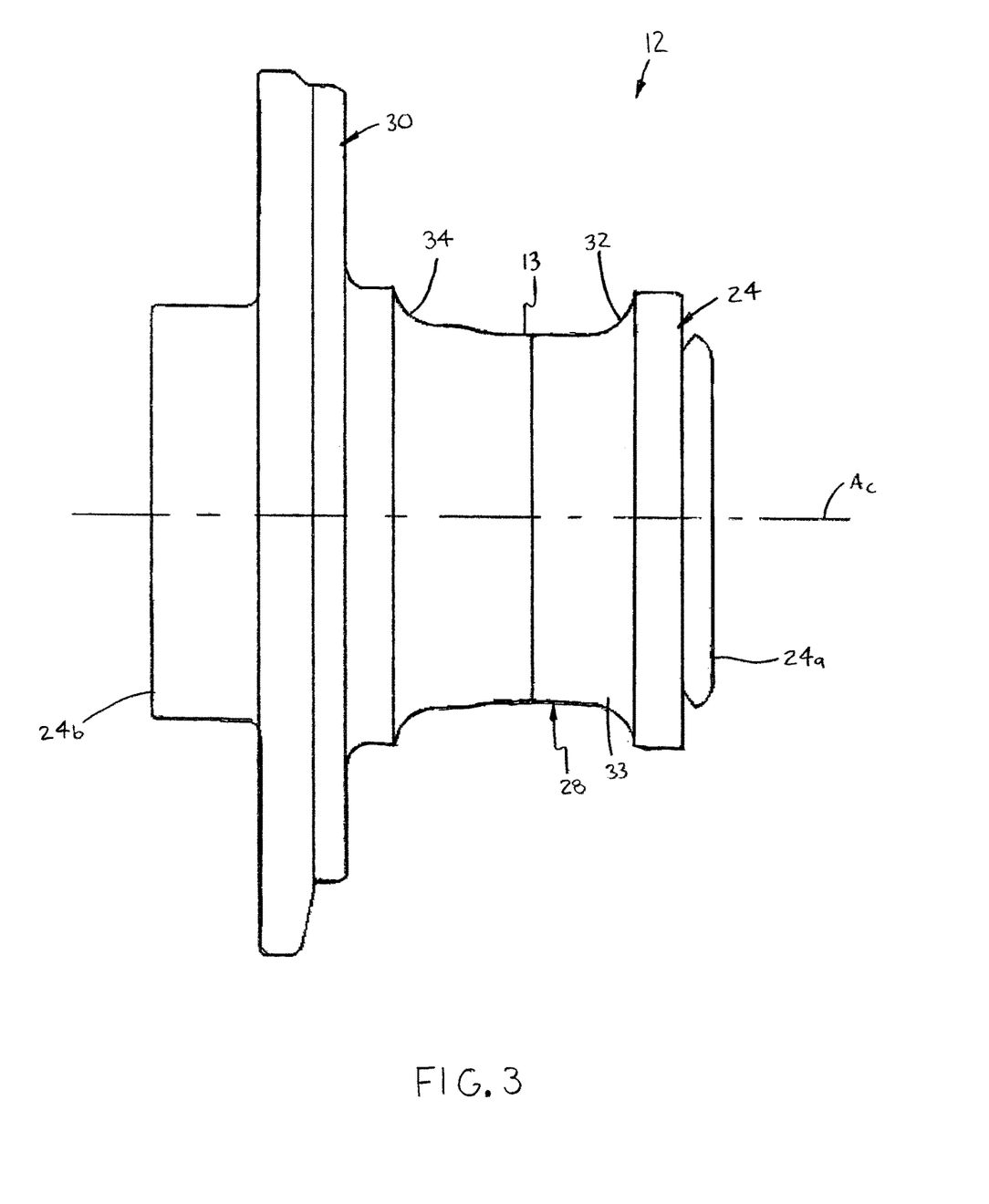
FIG. 3 is a side plan view of an inner hub of the wheel hub assembly.
Figure 4:
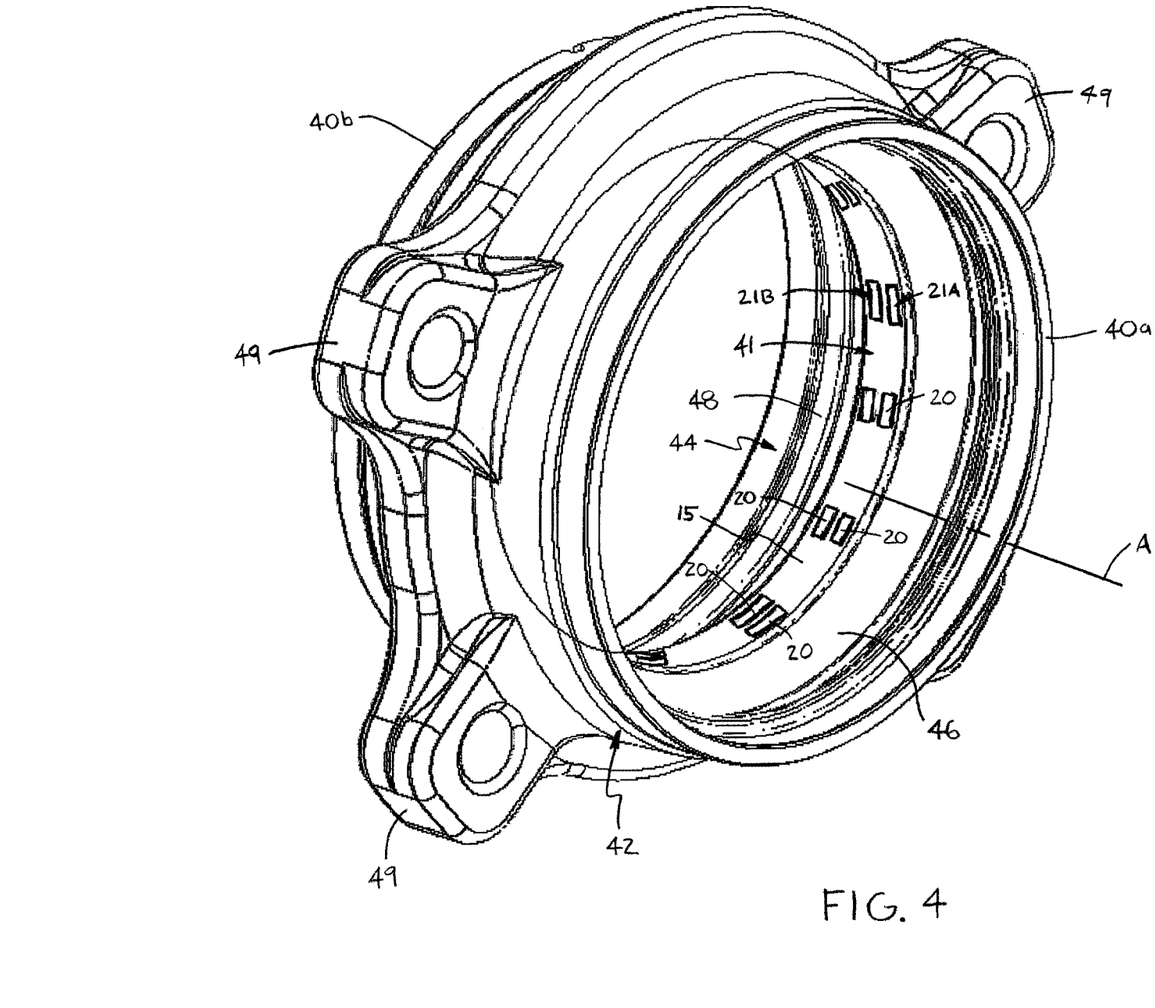
FIG. 4 is a perspective view of an outer hub of the wheel hub assembly.
Figure 6:
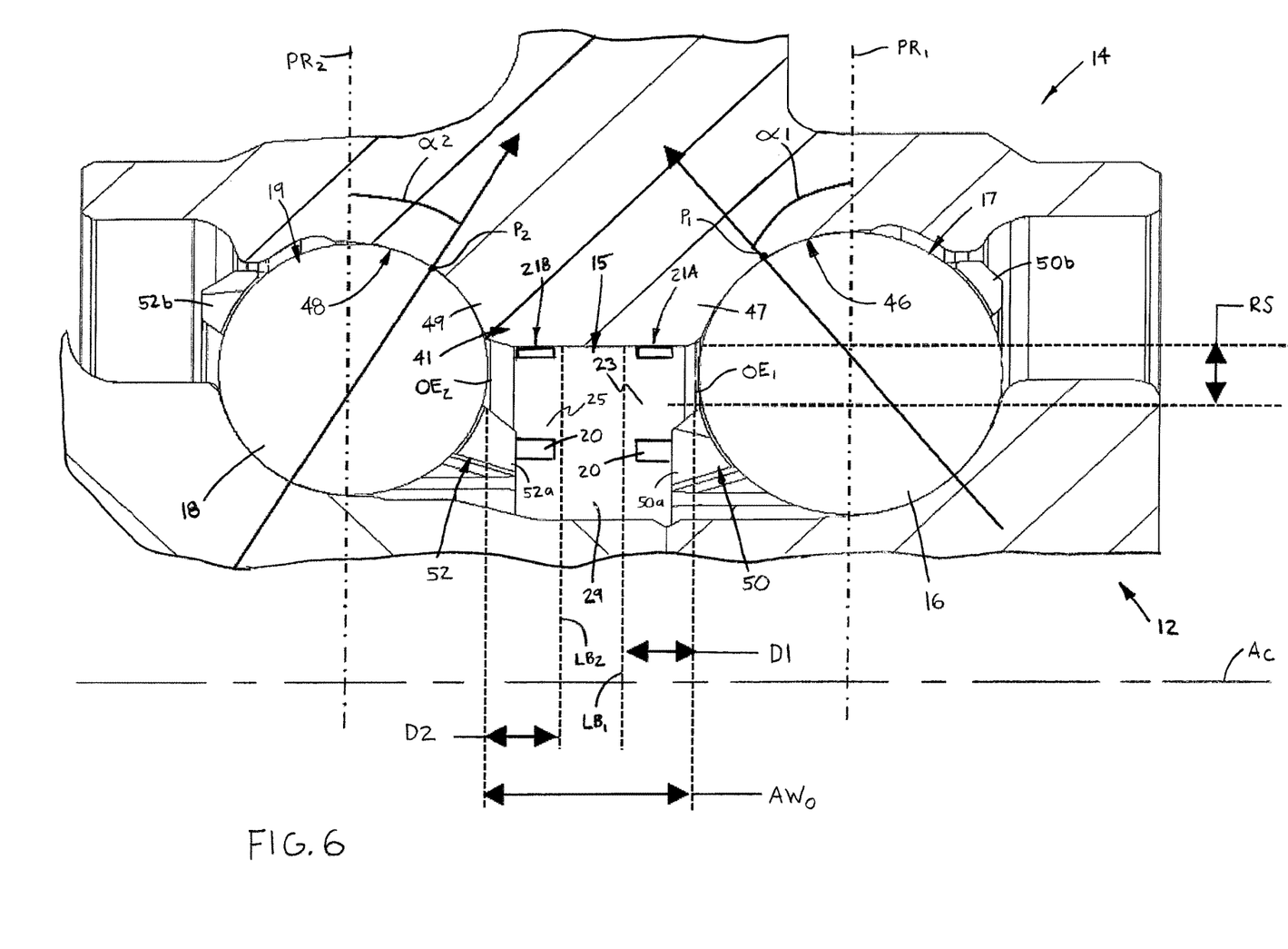
FIG. 6 is an another enlarged, broken-away view of the wheel hub assembly of FIG. 1, indicating preferred placement boundaries for sensors.

Referring now to FIGS. 1, 2 and 6, the first set 17 of rolling elements 16 are disposed between the inboard inner race 32 and the inboard outer race 46 and the second set 19 of rolling elements 18 are disposed between the outboard inner race 34 and the outboard outer race 48. Thereby, the two sets 17, 19 of rolling elements 16, 18 rotatably couple the inner and outer hubs 12, 14, such that the inner hub 12 rotates about the axis $A_C$ within the outer hub 14. Preferably, the wheel bearing assembly 10 further comprises first and second cages 50, 52, respectively, for retaining the sets 17, 19 of rolling elements 16, 18. Specifically, the first cage 50 is configured to circumferentially space the first set 17 of rolling elements 16 and has an inner axial end 50a disposed axially adjacent to the central section 15 of the outer hub 14 and an opposing outer axial end 50b, as indicated in FIG. 6. Likewise, the second cage 52 is configured to circumferentially space the second set 19 of rolling elements 18 and has an inner axial end 52a disposed axially adjacent to the central section 15 of the outer hub 14 and an opposing outer axial end 52b, as shown in FIG. 6.

Figure 7:
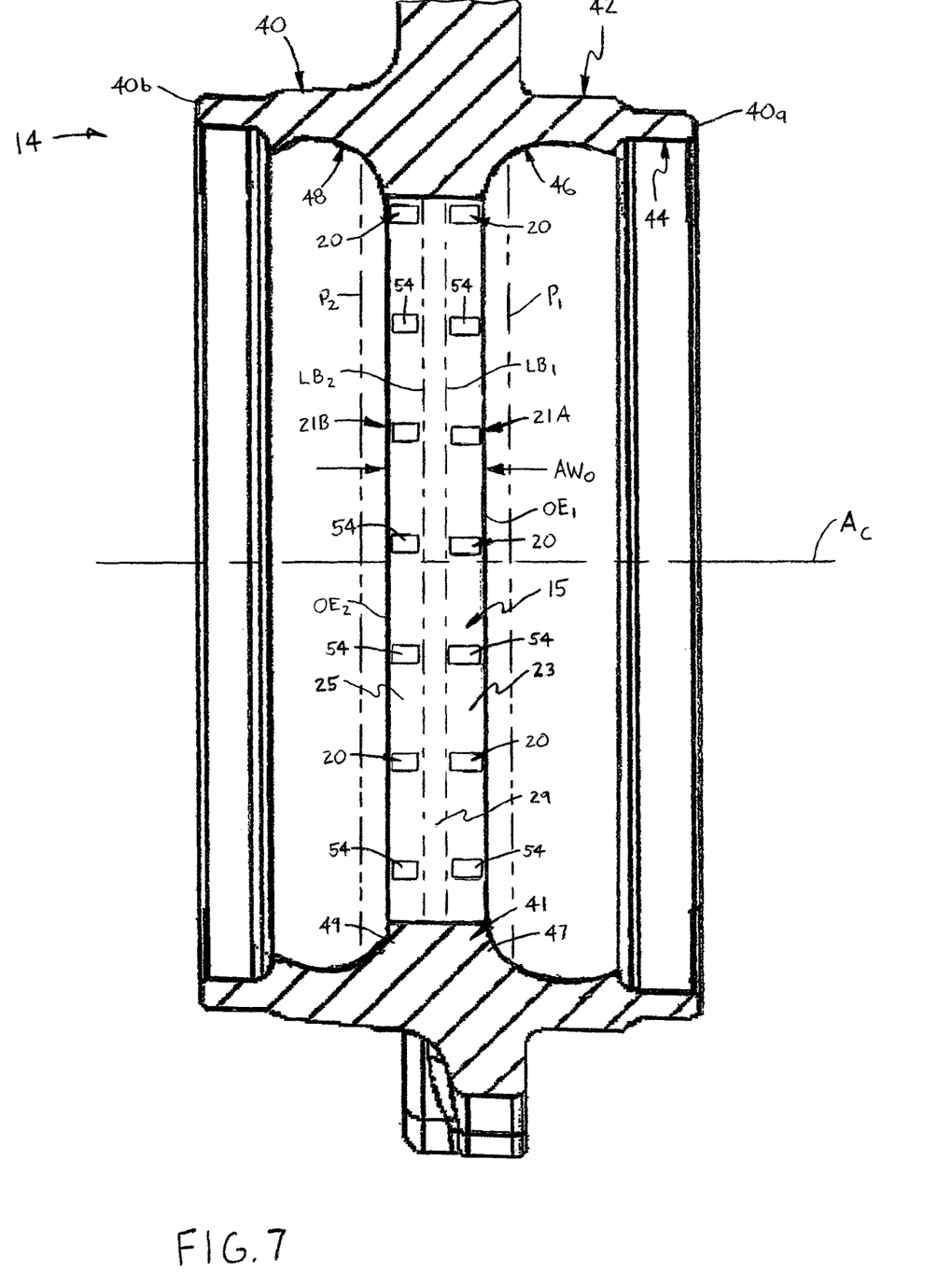
FIG. 7 is another axial cross-sectional view of the outer hub showing preferred placements of two sets of strain gauges.

As indicated in FIGS. 6 and 7, the first set 17 of rolling elements 16 contacts the inboard outer race 46 along a circular contact path $P_1$ defining a first angle $\alpha 1$ with respect to any radial plane $PR_1$ through the central axis $A_C$. Similarly, the second set 19 of rolling elements 18 contacts the outboard outer race 34 along a circular contact path $P_2$ defining a second angle $\alpha 2$ with respect to radial plane(s) $PR_2$ through the central axis $A_C$. Preferably, in a presently preferred construction, the rolling elements 16 of the first rolling element set 17 are each sized diametrically larger than the rolling elements 18 of the second rolling element set 19, but may alternatively be substantially equally sized. Further, the rolling elements 16, 18 are preferably spherical rollers or balls, but may instead be formed as any other type of rolling element (e.g., cylinders, needles, toroidals, etc.) or/and may be of differing types, such as for example, a combination of spherical rollers 16 and cylindrical rollers 18.

With above-described structure of the inner and outer hubs 12, 14, the one or more sensors 20 is/are preferably disposed on or within the central surface section 15 of the outer hub 14 and are each configured to sense strain within the outer hub 14 generated by the rolling elements 16, 18. Alternatively, the sensor(s) 20 may be disposed on/within the central surface section 13 of the inner hub 12 and configured to sense strain within the inner hub 12 generated by the rolling elements 16, 18, as shown in FIG. 8. Generally, the sensors 20 should be mounted on or attached to the hub 14 or 12 that is non-rotatable or fixed in the specific arrangement of a particular hub assembly 10. Preferably, the wheel hub assembly 10 includes a plurality of the sensors 20 each disposed on the central surface section 15 (or section 13) and spaced apart circumferentially about the central axis $A_C$. As such, the sensors 20 are located to sense strain at various circumferential positions on the outer hub 14 or the inner hub 12.

Most preferably, the wheel hub assembly 10 includes two axially spaced sets 21A, 21B of sensors 20 each located generally adjacent to a separate set 17, 19 of the rolling elements 16, 18. Specifically, each sensor 20 of the first set 21A of sensors 20 is disposed on the central surface section 15 and is spaced apart circumferentially about the central axis $A_C$ from each other sensor 20 of the first set 21A of sensors 20. Similarly, each sensor 20 of the second set 21B of sensors 20 is disposed on the central surface section 15 and is spaced apart circumferentially about the central axis $A_C$ from each other sensor 20 of the second set 21B of sensors 20. Although depicted in the drawing figures as being at least generally axially aligned (e.g., as shown in FIG. 7), the sensors 20 of each sensor set 21A, 21B may be "staggered" or located at different angular/circumferential positions in comparison with the sensors 20 of the other sensor set 21B, 21A

With two sets 17, 19 of rolling elements 16, 18, there is a chance of interference or "cross-talk" (i.e., overlapping strain "fields" which make it difficult to determine if a portion of strain is coming from set 17 or 19) at certain locations on the surface section 15 between the strain generated by one set 17, 19 of the rolling elements 16, 18 with the strain generated by the other rolling element set 19, 21. In other words, within certain sections of the outer hub 14 (and the inner hub 12), the total strain detected is the combination of the strain generated by the first set 17 of rolling elements 16 and the strain generated by the second set 19 of rolling elements 18 (as well as other loading such as bending stresses, impact loading etc.). As a result, the strain measured by any sensor 20 may be greater or lesser than the actual strain generated by either single set 17, 19 of the rolling elements 16, 18 due to the strains from one roller set 17 or 19 combining with or subtracting from the strain generated by the other roller set 19, 17.

Referring to FIGS. 6 and 7, in view of the above considerations, the sensors 20 of the two preferred sensor sets 21A, 21B are positioned so as to measure only the strains generated by a single one of the two sets 17 or 19 of the rolling elements 16, 18, i.e., the proximal set of rolling elements, while avoiding interference or "cross-talk" from the other set 19, 17 of rolling elements 18, 16. Specifically, each of the two preferred sets 21A, 21B of sensors 20 are located on a separate one of two cylindrical surface subsections 23, 25, respectively, of the central surface section 15, each limited by a separate innermost boundary line $LB_1$, $LB_2$, respectively. On such surface subsections 23, 25, interference from the "other" set 17, 19 of the rolling elements 16, 18 (i.e., the rolling element set 17, 19 not monitored by the particular set 21A, 21B of the sensors 20) is avoided due to the minimal degree or magnitude of strain generated by the other rolling element set 17, 19 within the surface subsection 23, 25. From empirical analysis, the following equations have been ascertained to provide the location of the first innermost circumferential boundary line $LB_1$, which is spaced a first distance D1 from the first circumferential edge $OE_1$, and the location of the second innermost circumferential boundary line $LB_2$, which is spaced a second distance D2 from the second circumferential edge $OE_2$:

$$D1 = AW/2 - (0.55 + 0.4 \times \text{Arctangent}(5 \times \alpha 1 - 225))$$

$$D2 = AW/2 - (0.55 + 0.4 \times \text{Arctangent}(5 \times \alpha 2 - 225))$$

Thus, the first set 21A of the sensors 20 is preferably located axially between the first circumferential edge $OE_1$ and the first circumferential boundary line $LB_1$ spaced axially from the first edge $OE_1$ by the first distance D1. Similarly, the second set 21B of the sensors 20 is preferably located axially between the second circumferential edge $OE_2$ and the second circumferential boundary line $LB_2$ spaced from the second edge $OE_2$ by the second distance D2. The first and second boundary lines $LB_1$, $LB_2$ are spaced axially apart such that a "dead zone" 29 is defined between the sensor mounting/attachment surfaces 23, 25, on which sensor placement is to be avoided in order to prevent interference or cross-talking.

Also, to provide sufficient radial space for the sensors 20 to be mounted or disposed on the central inner surface section 15 of the outer hub 14, each of the cages 50, 52 is generally angled or tilted. Specifically, the inner axial end 50a, 52a of each cage 50, 52 is spaced radially inwardly from the central surface section 15 by a radial spacing distance RS (FIG. 6), which is preferably at least two millimeters (2 mm). Thus, the combination of positioning each set 21A, 21B of sensors 20 axially between the circumferential edges $OE_1$, $LB_1$ and $OE_2$, $LB_2$, and providing at least two millimeters of radial spacing RS between the central surface section 15 and the cage inner ends 50a, 52a, enables the sensors 20 be positioned on the central surface section 15 so as to only sense strain from one rolling element set 17 or 19.

Referring particularly to FIG. 7, each sensor 20 of the two preferred sets 21A, 21B of sensors 20 is preferably a strain gauge 54 arranged to detect circumferential strain within the outer hub 14 and/or axial strain within the outer hub 14 (or within the inner hub 12 in certain constructions). Each sensor 20 is preferably formed as a strain gauge 54 of any appropriate type and attached to the hub 14 by any appropriate means. For example, the strain gauges 54 may be any one or more of the following types: glued thin film, glued thick film, laser deposit thick film, screen printed thick film, glued silicon based strain gauge, piezoelectric, printed piezoresistive on stainless steel substrate, glued stainless steel substrate with sensor, welded stainless steel substrate with sensor, stainless steel substrate with printed thick film, stainless steel substrate with laser deposited thick film, or stainless steel substrate with glued thin film or silicon based strain gauge. However, the sensors 20 may be any other type of strain gauge, or any other type of sensor capable of sensing strain, such as an optical strain sensors, etc.

Figure 9:
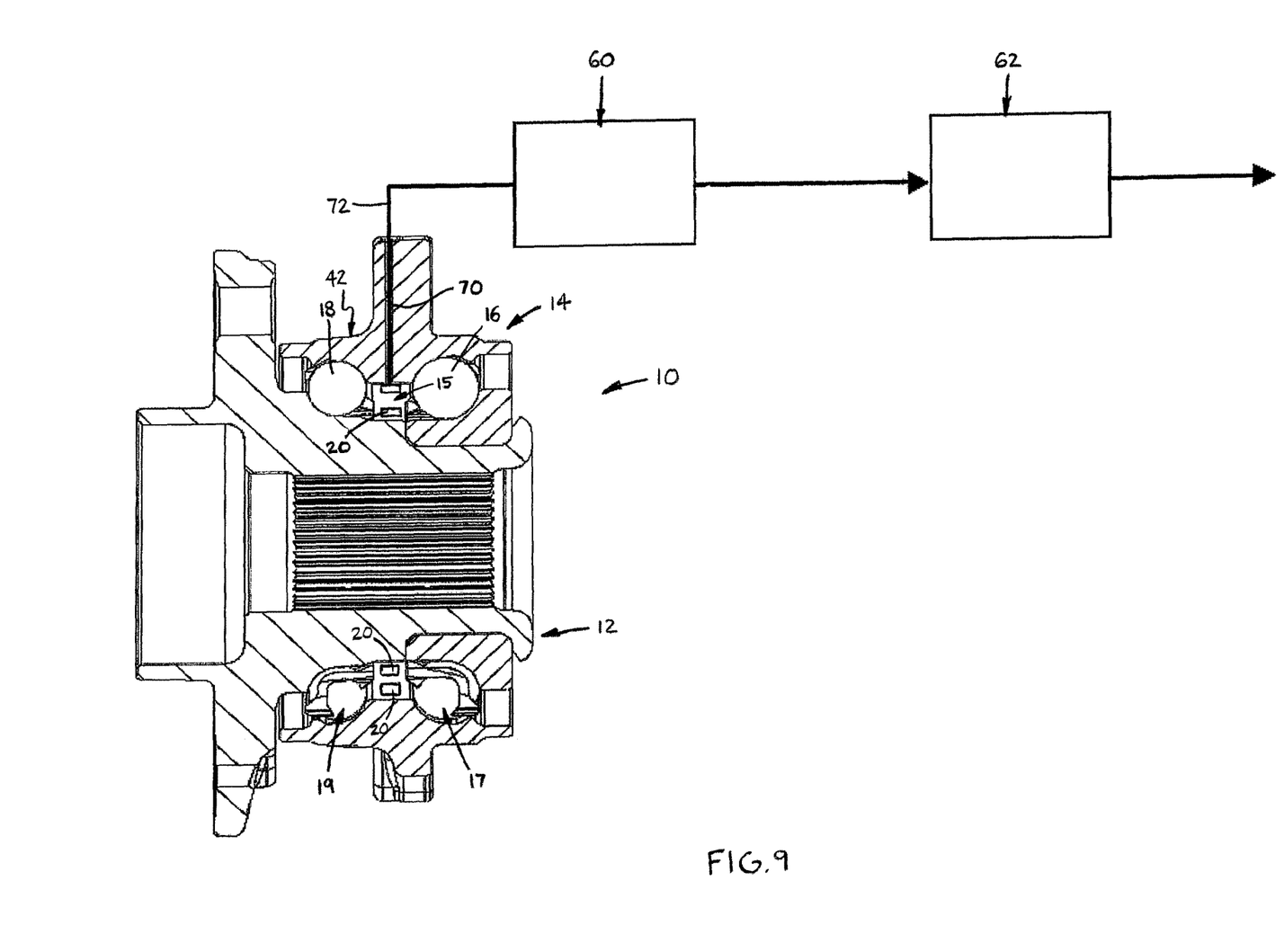
FIG. 9 is an axial cross-sectional view of the wheel hub assembly shown with preferred electronic processing components.

Referring specifically to FIG. 9, the wheel hub assembly 10 preferably further comprises, or is at least configured to electrically connect with, a signal conditioner 60 and a processor 62. Specifically, the signal conditioner 60 is electrically connected with each sensor 20 of the first set of sensors 21A and with each sensor 20 of the second set 21B of sensors 20. The conditioner 60 is configured to receive signals from each sensor 20 and to digitally convert, amplify and/or filter each signal for additional processing. That is, it is typically necessary to convert an analog signal to a digital signal for analysis by a processor or other device and signals sensing strain from rolling elements are typically low amplitude, such that amplification enhances the ability to process the signal information. Also, when there are known frequencies that may be generated from sources other than the rolling elements 16, 18 (i.e., noise), filtering such signals also improves the information received from the sensors 20 and eliminates extraneous information.

Further, the processor 62 is electrically connected with the signal conditioner 60 or directly with each sensor 20 of the first and second sensor sets 21A, 21B (i.e., if the processor 62 has integral signal processing circuitry). In any case, the processor 62 is configured to determine loading at discrete positions about the circumference of the outer hub 14 by analyzing the signals received from the conditioner 60 or directly from the sensors 20. Thereby, the loading information can be sent to another controller or processor (none shown) to convert the strain information into loading, i.e. force and moments on the hub 14, for example to execute certain functionality, to operate other vehicle systems (e.g., brakes) or to merely provide a warning. For example, an increase in detected strain of a certain magnitude may indicate an imminent failure of the wheel hub assembly 10.

Still referring to FIG. 9, the outer hub 14 has at least one and preferably a plurality of radial passages 70 (only one shown) extending between the central surface section 15 and the outer circumferential surface 42 of the outer hub 14. Each passage 70 is configured to receive one or more electrical wires 72 (one shown), each wire 72 electrically connecting the signal conditioner 60 or the processor 62 with one sensor 20 of the first set 21A of sensors 20 or of the second set 21B of sensors 20. Currently, it is preferred to have a separate wire 72 extending from each sensor 20 of the first set 21A of sensors 20 and from each sensor 20 of the second set 21B of sensors 20 to the signal conditioner 60.

However, the sensors 20 of the two preferred sensor sets 21A, 21B may be "wired" to the signal conditioner 60, or directly to the processor 62, in any appropriate manner. Alternatively, the sensors 20 of one or both sensor sets 21A, 21B may be configured to wirelessly communicate with the signal conditioner 60 or with the processor 62.

The wheel hub assembly 10 of the present invention has a number of advantages over previously known wheel hub assemblies. By positioning the sensors 20 within the interior of the hub assembly 10, the sensors 20 are well protected from damage due to impact or other forces applied to the hub assembly 10 and are located within a sealed environment to avoid damage from corrosive substances, etc. As such, there is no need to provide separate structure to protect the sensors 20, such as shields, cover(s), etc. Also, the hub central surface section 15 or 13 provides a smooth, continuous circumferential surface that enables attachment about all points or locations around the full circumference of the surface section 15 (or 13) without the need to avoid hub components such as the outer mounting lugs 49 or flange (not shown), etc. Furthermore, by precisely determining the width or axial length D1, D2 of the cylindrical mounting surface subsections 23, 25, the sensors 20 may be located to assess loading by a single set 17, 19 of rolling elements 16, 18 without potential interference from the other rolling element set 19, 17.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A sensorized wheel hub assembly for rotatably connecting a wheel with at least one of a shaft and a chassis, the hub assembly comprising:

an inner hub rotatable about a central axis and having opposing inboard and outboard axial ends, a radial flange extending outwardly from the outboard axial end and connectable with the wheel, an inner circumferential surface defining a central bore for receiving the shaft, and an opposing outer circumferential surface, the outer surface providing an inboard inner race and an outboard inner race spaced axially from the inboard inner race;

an outer hub disposed about the inner hub, connectable with the chassis and having inboard and outboard axial ends, an outer circumferential surface and an inner circumferential surface, the inner surface providing an inboard outer race, an outboard outer race spaced axially from the inboard outer race, and a central surface section extending between the inboard and outboard outer races;

a first set of rolling elements disposed between the inboard inner race and the inboard outer race;

a second set of rolling elements disposed between the outboard inner race and the outboard outer race; and at least one sensor disposed on the central surface section of the outer hub and configured to sense strain within the outer hub generated by the rolling elements.

2. The wheel hub assembly as recited in claim 1 wherein the at least one sensor includes a plurality of the sensors each disposed on the central surface section and spaced apart circumferentially about the central axis.

3. The wheel hub assembly as recited in claim 1 wherein the at least one sensor includes:

a first set of the sensors, each sensor of the first set of sensors being disposed on the central surface section and spaced apart circumferentially about the central axis from each other sensor of the first set of sensors; and a second set of the sensors spaced axially from the first set of sensors, each sensor of the second set of sensors being disposed on the central surface section and spaced apart circumferentially about the central axis from each other sensor of the second set of sensors.

4. The wheel hub assembly as recited in claim 3 wherein: the first set of rolling elements contacts the inboard outer race along a circular contact path defining a first angle ($\alpha 1$) with respect to any radial plane through the central axis; the second set of rolling elements contacts the outboard outer race along a circular contact path defining a second angle ($\alpha 2$) with respect to any radial plane through the central axis; the central surface section is defined between a first circumferential edge adjacent to the inboard outer race and a second circumferential edge adjacent to the outboard outer race and has an axial width (AW) between the first and second circumferential edges; the first set of sensors is located axially between the first circumferential edge and a first circumferential boundary line spaced axially from the first edge by a first distance (D1); the second set of sensors is located between the second circumferential edge and a second circumferential boundary line spaced from the second edge by a second distance (D2), the second boundary line being spaced axially from the first boundary line; and wherein the first and second distances (D1), (D2) are calculated as follows:

$$D1 = AW/2 - (0.55 + 0.4 \times \text{Arctangent}(5 \times \alpha 1 - 225))$$

$$D2 = AW/2 - (0.55 + 0.4 \times \text{Arctangent}(5 \times \alpha 2 - 225)).$$

5. The wheel hub assembly as recited in claim 3 further comprising:

a first cage configured to circumferentially space the first set of rolling elements and having an inner axial end disposed axially adjacent to the central section of the outer hub, the inner end of the first cage being spaced radially inwardly from the central surface section by at least two millimeters; and a second cage configured to circumferentially space the second set of rolling elements and having an inner axial end disposed axially adjacent to the central section of the outer hub, the inner end of the second cage being spaced radially inwardly from the central surface section by at least two millimeters.

6. The wheel hub assembly as recited in claim 3 further comprising at least one of:
a signal conditioner electrically connected with each sensor of the first set of sensors and with each sensor of the second set of sensors, the conditioner being configured to receive signals from each sensor and to at least one of digitally convert, amplify and filter each signal; and
a processor electrically connected with the signal conditioner or with each sensor of the first set of sensors and with each sensor of the second set of sensors, the processor being configured to determine loading at discrete positions about the circumference of the outer hub by analyzing signals received from the conditioner or from the sensors.

7. The wheel hub assembly as recited in claim 6 wherein the outer hub has at least one radial passage extending between the central surface section and the outer circumferential surface of the outer hub and configured to receive at least one electrical wire, the wire electrically connecting the signal conditioner or the processor with at least one sensor of the first set of sensors or of the second set of sensors.

8. The wheel hub assembly as recited in claim 6 wherein each sensor of the first set of sensors and each sensor of the second set of sensors is configured to wirelessly communicate with the signal conditioner or with the processor.

9. The wheel hub assembly as recited in claim 1 wherein the outer hub has a radially-inwardly extending central projection, the projection providing the central surface section, a shoulder of the inboard outer race and a shoulder of the outboard outer race, the central surface section extending axially between first and second shoulders.

10. The wheel hub assembly as recited in claim 1 wherein the at least one sensor is a strain gauge arranged to detect at least one of circumferential strain within the outer hub and axial strain within the outer hub.

11. A wheel hub assembly for connecting a wheel with at least one of a shaft and a chassis, the hub assembly comprising:
an inner hub connectable with one of the wheel and the chassis and having opposing inboard and outboard axial ends, an inner circumferential surface defining a central bore for receiving the shaft, and an opposing outer circumferential surface, the outer surface providing inboard inner race, an outboard inner race spaced axially from the inboard inner race, and a central surface section extending between the inboard and outboard inner races;
an outer hub disposed about the inner hub, connectable with the other one of the wheel and the chassis, and having inner and outer axial ends, an outer circumferential surface and an inner circumferential surface, the inner surface providing an inboard outer race, an outboard outer race spaced axially from the inboard outer race, and a central surface section extending between the inboard and outboard outer races;
a first set of rolling elements disposed between the inboard inner race and the inboard outer race;
a second set of rolling elements disposed between the outboard inner race and the outboard outer race; and
at least one sensor disposed on the central surface section of the inner hub when the inner hub is fixedly connected with the chassis and configured to sense strain within the inner hub generated by the rolling elements or at least one sensor disposed on the central surface section of the outer hub when the outer hub is fixedly connected with the chassis and configured to sense strain within the outer hub generated by the rolling elements.

12. A sensorized wheel hub assembly for rotatably connecting a wheel with at least one of a shaft and a chassis, the hub assembly comprising:
an inner hub rotatable about a central axis and having opposing inboard and outboard axial ends, a radial flange extending outwardly from the outboard axial end and connectable with the wheel, an inner circumferential surface defining a central bore for receiving the shaft, and an opposing outer circumferential surface, the outer surface providing an inboard inner race and an outboard inner race spaced axially from the inboard inner race;
an outer hub disposed about the inner hub, connectable with the chassis and having inboard and outboard axial ends, an outer circumferential surface and an inner circumferential surface, the inner surface providing an inboard outer race, an outboard outer race spaced axially from the inboard outer race, and a central surface section extending between the inboard and outboard outer races;
a first set of rolling elements disposed between the inboard inner race and the inboard outer race;
a second set of rolling elements disposed between the outboard inner race and the outboard outer race; and
at least one sensor disposed on the central surface section of the outer hub and configured to sense strain within the outer hub generated by the rolling elements;
wherein the at least one sensor includes a first set of the sensors, each sensor of the first set of sensors being disposed on the central surface section and spaced apart circumferentially about the central axis from each other sensor of the first set of sensors, and a second set of the sensors spaced axially from the first set of sensors, each sensor of the second set of sensors being disposed on the central surface section and spaced apart circumferentially about the central axis from each other sensor of the second set of sensors.

* * * * *